(12) United States Patent
Finger et al.

(10) Patent No.: US 9,908,279 B2
(45) Date of Patent: Mar. 6, 2018

(54) BLOW MOULDING MACHINE WITH SEPARATE PRESSURE PAD CONTROL

(71) Applicant: KRONES AG, Neutraubling (DE)

(72) Inventors: Dieter Finger, Neutraubling (DE); Peter Lex, Neutraubling (DE); Thomas Spitzer, Wiesent (DE)

(73) Assignee: KRONES AG (DE)

( * ) Notice: Subject to any disclaimer, the term of this patent is extended or adjusted under 35 U.S.C. 154(b) by 851 days.

(21) Appl. No.: 14/274,516

(22) Filed: May 9, 2014

(65) Prior Publication Data

US 2014/0339743 A1    Nov. 20, 2014

(30) Foreign Application Priority Data

May 15, 2013    (DE) .......................... 10 2013 104 995

(51) Int. Cl.
  *B29C 49/78*    (2006.01)
  *B29C 49/56*    (2006.01)
  *B29C 49/48*    (2006.01)

(52) U.S. Cl.
  CPC ............ *B29C 49/783* (2013.01); *B29C 49/56* (2013.01); *B29C 2049/4858* (2013.01); *B29C 2049/4864* (2013.01); *B29C 2049/4892* (2013.01); *B29C 2049/563* (2013.01)

(58) Field of Classification Search
  None
  See application file for complete search history.

(56) References Cited

U.S. PATENT DOCUMENTS

| | | | |
|---|---|---|---|
| 5,993,721 A | 11/1999 | Kurihara et al. | 264/402 |
| 6,099,286 A | 8/2000 | Nitsche | 425/168 |
| 6,444,160 B1 * | 9/2002 | Bartoli | B29C 49/0047 264/545 |

(Continued)

FOREIGN PATENT DOCUMENTS

| | | | |
|---|---|---|---|
| CN | 1144735 | 3/1997 | B29C 49/20 |
| CN | 102950757 | 3/2013 | B29C 49/00 |

(Continued)

OTHER PUBLICATIONS

Chinese Office Action (w/translation) issued in application No. 20140193009.9, dated Dec. 29, 2015 (28 pgs).

*Primary Examiner* — Monica Huson
(74) *Attorney, Agent, or Firm* — Hayes Soloway P.C.

(57) ABSTRACT

Plastic preforms are introduced into a blow mold and are expanded by applying a flowable medium thereto, which is introduced into the internal space of the plastic preforms, wherein the blow mold includes at least two lateral parts which form a cavity during the expansion of the plastic preforms, within which the plastic containers are expanded. The lateral parts are respectively provided on lateral part carriers that are moved relative to each other for opening and closing the blow mold. At least one arrangement of a lateral part carrier and the lateral part provided thereon has an expansion element that can have a gaseous medium applied thereto. The expansion element ensures, when the gaseous medium is applied thereto, that one lateral part is moved towards the other lateral part. During the expansion of the plastic preforms, at least two different pressure levels are applied.

17 Claims, 4 Drawing Sheets

(56) References Cited

U.S. PATENT DOCUMENTS

| | | | | |
|---|---|---|---|---|
| 6,729,868 B1 * | 5/2004 | Vogel | ...................... | B29C 49/56 425/195 |
| 2005/0142243 A1 | 6/2005 | Tsau et al. | .................... | 425/522 |
| 2006/0093699 A1 | 5/2006 | Arakelyan | .................... | 425/541 |
| 2012/0098166 A1 | 4/2012 | Voth | .............. | 264/523 |
| 2012/0135101 A1 | 5/2012 | Blanchard | .................... | 425/522 |
| 2012/0223465 A1 | 9/2012 | Voth et al. | .................... | 264/523 |
| 2013/0043622 A1 | 2/2013 | Hoellriegl et al. | ........... | 264/572 |

FOREIGN PATENT DOCUMENTS

| | | | | |
|---|---|---|---|---|
| DE | 102008018785 | 10/2009 | ............. | B29C 49/42 |
| DE | 10 2010 049 025 | 4/2012 | ............. | B29C 49/42 |
| DE | 10 2011 013 124 | 9/2012 | ............. | B29C 49/46 |
| DE | 10 2011 052 865 | 2/2013 | ............. | B29C 49/42 |
| EP | 2475510 | 7/2012 | ............. | B29C 33/30 |
| FR | 2 963 580 | 8/2010 | ............. | B29C 49/48 |
| WO | WO2011026805 | 3/2011 | ............. | B29C 49/48 |

* cited by examiner

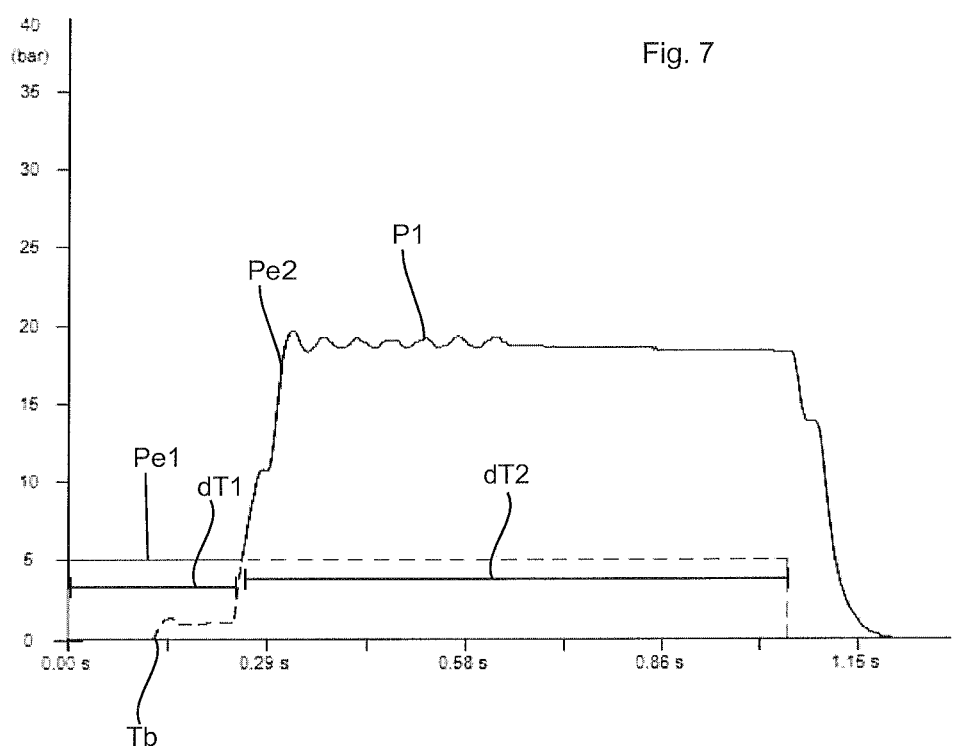

BLOW MOULDING MACHINE WITH SEPARATE PRESSURE PAD CONTROL

BACKGROUND OF THE INVENTION

The present invention relates to an apparatus and a method for moulding plastic preforms into plastic containers and in particular into plastic bottles. Such apparatus and methods have been known from the prior art for a long time. In this respect, heated plastic preforms are usually moulded in blowing stations by applying pressurised air onto plastic bottles. To this end, the plastic preforms are introduced into a blow mould, which is then closed, and in this closed condition the expansion of the plastic preforms is carried out. One problem that frequently occurs in connection with this moulding process is the interface between the two blow mould parts, for example blow mould halves, which during production can lead to undesired seams on the finished container.

It is therefore known in the prior art to use so-called pressure pads in such moulding stations, which pressure pads press, during the expansion of the plastic preforms, the two blow mould parts or blow mould halves onto each other. In this approach which is known from the applicant's internal prior art, the same pressure that during the blow moulding process is passed into the container and is therefore prevalent therein, is also applied to the pressure pad. Therefore, the pressure profile in the pressure pads corresponds here to the blowing pressure profile. As a result, always only the pressure that is required at any given moment for keeping the blow mould shut so that there is no mould gap is applied to this pressure pad. The mould carrier will never be stressed beyond that.

It is further known from the applicant's internal prior art to provide a separate pressure pad control which ensures that pressure is already applied onto the pressure pad prior to the blowing process, which pressure is even higher than the final blowing pressure. In the course of this, the pressure pad pressure is kept constant during the entire blowing process. This embodiment is especially relevant in the case of large-volume containers, where the projected area would build up such a great force that the final blowing pressure is no longer sufficient to keep the moulds shut or against each other. The disadvantage of this approach consists in higher energy consumption and in the fact that the load on the mould carrier is very high.

In a further approach known from the applicant's internal prior art, the pressure pad is actuated using a lower pressure compared to the final blowing pressure. This is also referred to as pressure pad reduction. Pressure is already applied to the pressure pad prior to the blowing process. The pressure pad pressure continues to be kept constant during the entire blowing process. This embodiment is particularly useful for small-volume containers, and in this case the stress on the mould carrier can be significantly reduced.

In a further method known from the prior art, in which the pressure profile of the pressure pad corresponds exactly with the blowing pressure profile, the pressure pad will not move until after the shaping process of the container has already started. However, this may lead to a seam to be formed in the container, because the mould gap has not yet been closed.

The present invention is therefore based on the object of avoiding on the one hand, as far as possible, a bottle seam to be formed and moreover also of achieving a gentle movement of the mould halves and a lower stress on the mould carrier.

SUMMARY OF THE INVENTION

In a method according to the invention for moulding plastic preforms and in particular for moulding plastic preforms into plastic containers, such as in particular, but not exclusively, plastic bottles, the plastic preforms are introduced into a blow mould and are expanded by having a flowable medium applied thereto, which is introduced into the internal space of the plastic preforms. Further the blow mould has at least two lateral parts, form a cavity on the inside thereof during the expansion of the plastic preforms, within which cavity the plastic containers are expanded. Here again, these lateral parts are respectively provided on lateral part carriers, which are moved relative to each other for opening and closing the blow mould. Further, at least one assembly of a lateral part carrier and the lateral part provided thereon includes an expansion element onto which a gaseous medium may be applied, which expansion element ensures, when the gaseous medium is applied thereto, that one lateral part is fed towards the other lateral part. Further, during the expansion of the plastic preforms, at least two different pressure levels are applied to the latter, and this application of pressure onto the plastic preforms starts at a predetermined point in time.

According to the invention, a first pressure is applied to the expansion element during a first time section of the expansion process, and a second pressure, which is greater than the first pressure, is applied during a second time section which follows in time after the first section, wherein the first pressure preferably deviates, at least at times, from the instantaneous pressure that is applied onto the plastic preform.

This means that the first pressure, if viewed in a predetermined time window, deviates from the pressure that is applied to the plastic preforms within this time window. Preferably within this time window, this pressure is higher than the pressure applied to the plastic preform. Preferably, pressure is already applied to the expansion element even before pressure is applied to the plastic preform.

Preferably, the pressure that is applied to the expansion element is always equal to or greater than the pressure that is applied to the plastic preform. On the other hand however, the pressure that is applied to the expansion element is preferably also lower, at least at times, than the maximum pressure that is applied to the plastic preform.

Thus, the second time section is after the predetermined point in time and the first time period is also preferably after the predetermined point in time. The predetermined period of time is here understood to mean that point in time, at which the blowing process is started or the application of pressure onto the plastic preforms is started.

The expansion element is in particular the pressure pad described above. This may be a space onto which a gaseous medium and in particular air can be applied and which as a result of this application will at least slightly expand, so that one lateral part moves towards the other lateral part, so that they are clamped shut. In this way, the two lateral parts are advantageously pressed against each other more firmly, in order to avoid or reduce the formation of seams. In this regard, this expansion element may advantageously be provided in a region between the lateral part carrier and the lateral part of the blow mould which is associated with this lateral part carrier. However, in addition it would also be possible to provide carrier shells, on which in turn the lateral parts are located. The expansion element is preferably located between the lateral part carrier and the carrier shell, however, it would also be conceivable to locate it between the carrier shell and the respective lateral part of the blow mould.

Preferably, the plastic preforms are transferred during the expansion thereof. Particularly preferably, the plastic preforms are transferred along a circular path during the expansion thereof. In a further advantageous method, the plastic preforms are particularly preferably additionally stretched by introducing a rod-like body such as a stretching rod into the plastic preforms, which stretching rod stretches the plastic preforms at least partially in the longitudinal direction thereof during the expansion process. In a further advantageous method at least two, in particular three, different pressure levels are used in order to expand the plastic preforms. In this context it is possible to apply initially a pre-blowing pressure, subsequently an intermediate blowing pressure and finally a final blowing pressure onto the plastic preforms.

In a further advantageous method, such an expansion element is merely provided between one of the lateral parts and the associated lateral carrier part, however not between the respectively other lateral part and the corresponding other lateral carrier part.

In a further advantageous embodiment, a lateral part can be pivoted relative to the other one about a predetermined axis. This is advantageously an axis that is oriented perpendicularly to a transport level of the plastic preforms. This is in particular a pivot axis that extends vertically.

In a further advantageous method, said cavity is terminated not just by the lateral parts, but also by a bottom part of the blow mould.

In a further advantageous method, the two lateral parts are locked against each other. Here, a locking mechanism may be provided that locks, at least at times, the two lateral parts against each other during the expansion process.

In an advantageous method, the first pressure is lower than the second pressure. This means that initially a lower pressure and subsequently, in particular during the expansion process, a higher pressure is applied to the expansion element, i.e. the pressure pad.

In this regard it is possible for the pressure to rise continuously, however it would also be possible to supply the pressure in two different pressure stages. Advantageously, the second pressure is at least twice as large as the first pressure, preferably at least three times as large, preferably at least four times as large.

It is possible here to keep the first pressure initially constant, until the second pressure, i.e. the higher pressure, starts.

In a further advantageous method, pressure is already applied to the expansion elements prior to it being applied onto the plastic preform itself. This means that unlike the methods known from the prior art, pressure is already applied to the expansion element or the pressure pad even before pressure is applied to the plastic preform itself. In this context it is advantageously possible to apply a preferably low and particularly preferably constant pressure onto the expansion element as early as prior to the blow moulding process, which pressure moves or presses together the two lateral parts or mould halves.

It is further conceivable that the pressure that is applied to the expansion element is, at least at times, adapted to the application pressure for the plastic preforms. Thus it is conceivable that, as soon as the blow moulding pressure exceeds this already existing pressure, the pressure profile in the expansion element follows the blow pressure profile, so that there is no risk of a mould gap developing again when the blow moulding pressure rises. Advantageously, a pressure for the expansion element is again, at least at times, adapted to a pressure to be applied onto the plastic preforms. However, it would also be conceivable for the pressure to slightly, e.g. by up to 2 bar, exceed the pressure to be applied to the plastic preforms.

Thus, a lower pressure is preferably initially applied to the expansion element so as not to put any undue stress on the mould carrier or the blowing station, and subsequently the blowing pressure is preferably added for controlling the expansion element. To this end, an OR circuit is advantageously used, which will be described in detail below.

The switching between the two pressure levels for the expansion elements as described above can here also be carried out via "digitally switching" pneumatic valves.

In a further preferred method, the first pressure is between 2 bar and 25 bar, preferably between 3 bar and 20 bar, preferably between 3 bar and 15 bar and particularly preferably between 4 bar and 10 bar. This pressure level has shown to be particularly suitable for ensuring a sufficient moving together of the lateral parts of the blow mould without putting excessive stress on the blowing station or the lateral part carriers.

Preferably, as mentioned above, the second pressure applied to the plastic preform is an intermediate and/or final blowing pressure. Thus, the pressure for the expansion element may be adapted, within a predetermined period of time, to the final blowing pressure.

The present invention is further directed to a moulding unit for moulding plastic preforms into plastic containers and in particular into plastic bottles. This moulding unit includes a blow mould which in its turn has two lateral parts which in a closed condition of the blow mould form a cavity, within which the plastic preform can be expanded by applying a flowable medium thereto. Further, the apparatus includes an application unit that supplies the gaseous medium into an internal space of the plastic preforms for the expansion thereof, wherein the lateral parts are each provided on lateral part carriers that can be moved relative to each other for opening and closing the blow mould. Further, the apparatus includes an expansion element that can have a gaseous medium applied thereto, which ensures, when a gaseous medium is applied thereto, that a lateral part is fed or urged towards the other lateral part or is pre-biased in the direction of the other lateral part.

According to the invention, the moulding unit includes a control unit that allows the supply of the gaseous medium to the expansion element to be controlled, wherein a pressure of the medium supplied to the expansion element can be modified and is, at least at times, below the maximum pressure that is applied to the plastic preform.

It is therefore proposed on the side of the apparatus that the pressure that is applied to the expansion element or the pressure pad is modified in order to achieve the advantages mentioned above. Advantageously, the control unit is implemented in such a way that the pressure that is applied to the plastic preform, at least at times, is also applied to the expansion element.

In a preferred embodiment, the moulding unit includes a first reservoir that provides a pressurised, gaseous medium and is connected to the application unit, at least at times, via a connection line. This reservoir may for example be a ring channel that supplies the gaseous medium to one or a plurality of moulding stations. Advantageously, the apparatus includes a number of such reservoirs which therefore allow different pressure levels to be applied to the moulding unit.

In an advantageous embodiment, the moulding unit includes a second reservoir that provides pressurised, gaseous medium and that is connected, at least at times, to the expansion element via a connection line. It is therefore proposed here that a separate reservoir is provided, via which the gaseous medium can be supplied to the expansion element.

In a further advantageous embodiment, the above-mentioned control unit includes at least a first valve, via which the supply of the gaseous medium to the expansion element can be controlled. However, this valve has advantageously no influence on the actual blowing process, but preferably merely on the application of the gaseous medium onto the expansion element.

In a further advantageous embodiment, the control unit has a second valve, via which the supply of the gaseous medium to the expansion element can be controlled, wherein preferably at least one of the two valves is a check valve. Advantageously it would be conceivable for each of the two valves mentioned to be formed as check valves.

The present invention is further directed to a system for moulding plastic preforms into plastic bottles or plastic containers. This system includes a plurality of moulding units of the above-mentioned kind, and these moulding units are provided on a common movable carrier. Advantageously, the movable carrier is a rotatable carrier and in particular a so-called blow wheel. Advantageously, the individual moulding units are arranged on an outer perimeter of this carrier.

In a further advantageous embodiment, the apparatus has a supply unit that supplies the plastic preforms to the individual moulding units. Advantageously, also a discharge unit is provided which discharges the plastic preforms from the moulding units.

In a further advantageous embodiment, also a heating unit and in particular an oven is provided, which heats the plastic preforms prior to being supplied to the individual moulding units. Apart from that, also a sterilisation unit may be provided, which is used for sterilising the plastic preforms. The sterilisation unit may be located before, in or after the heating unit. Preferably, the sterilisation unit is provided downstream of the heating unit.

BRIEF DESCRIPTION OF THE DRAWINGS

Further advantages and embodiments will become evident from the attached drawings, wherein:

FIG. 7 shows a profile of the pressure for the expansion element.

DETAILED DESCRIPTION OF THE DRAWINGS

Figure 1:
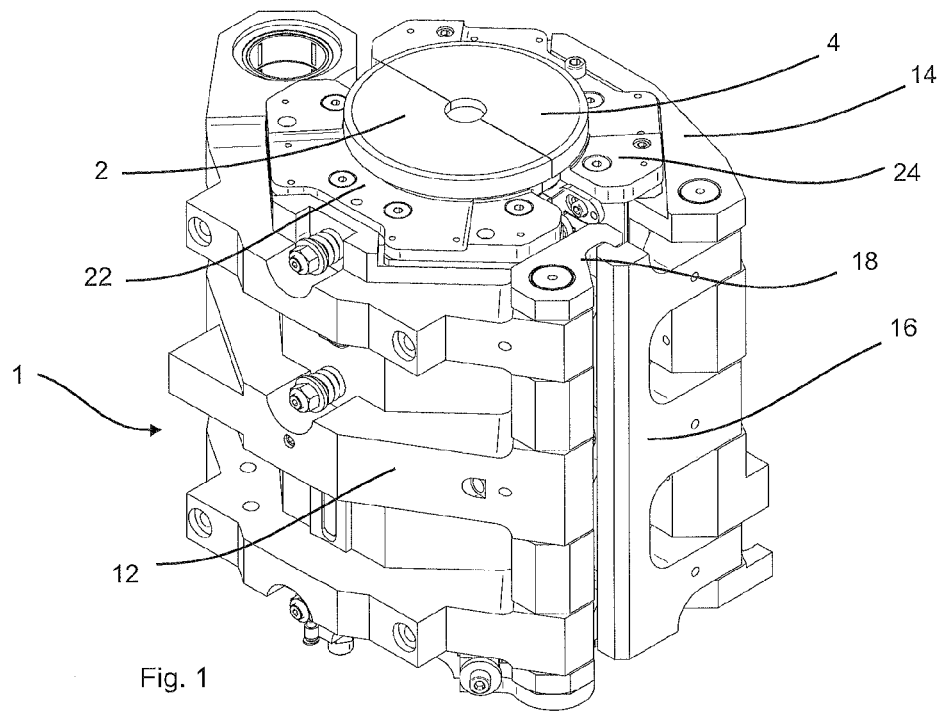
FIG. 1 shows a view of a moulding unit for moulding plastic preforms into plastic containers.

FIG. 1 shows a view of a moulding unit 1 for expanding plastic preforms into plastic containers. This moulding unit comprises here a blow mould having a first lateral part 2 and a second lateral part 4. These two lateral parts can be folded apart in order to receive between them a plastic preform, and can be folded back together again in order to apply a gaseous medium, in particular air, to this plastic preform on the inside of the blow mould. Reference numeral 12 relates to a first lateral part carrier that is intended for carrying the lateral part 2. Here, a blow mould carrier shell 22 is provided on this lateral part carrier 12, which in turn receives the lateral part 2 of the blow mould. Reference numeral 14 identifies a second lateral part carrier, on which the second lateral part 4 is disposed as well via a blow mould carrier shell 24. These two lateral part carriers 12, 14 can be pivoted together and apart with regard to a common shaft or axis for opening and closing the blow mould. Reference numerals 16 and 18 relate to two locking elements used to keep the blow mould in a closed condition during the expansion process. Here, the locking elements can pivot about an axis that also extends in the same direction as the axis of the two lateral part carriers 12, 14.

Figure 2:
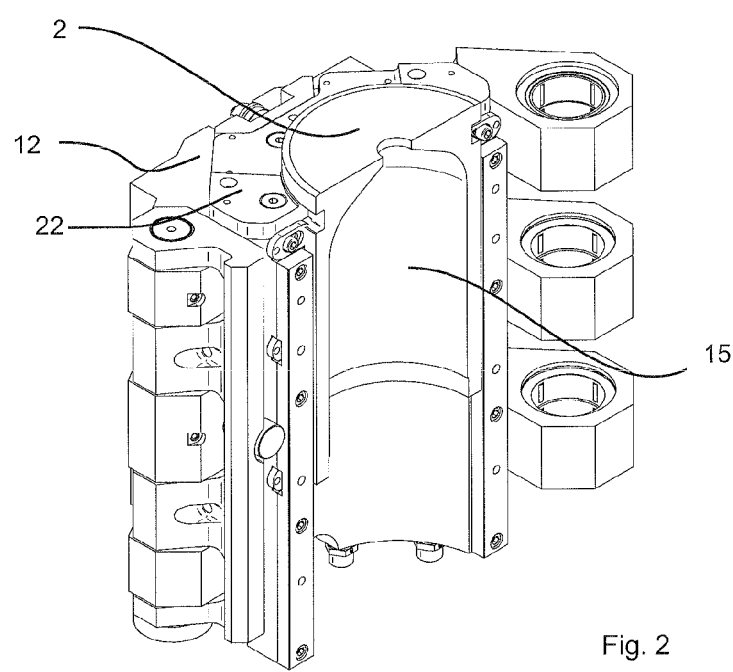
FIG. 2 shows a partial view of one half of the moulding unit shown in FIG. 1.

FIG. 2 shows a partial view or one half of the moulding unit 1 shown in FIG. 1. What can be seen here again is the lateral part carrier 12, on which the lateral part 2 is mounted via the carrier shell 22. What can further be seen is also a part of the cavity 15, within which the plastic preforms are expanded into plastic containers or, more specifically, are expanded against a wall of the lateral part 2.

Figure 3:
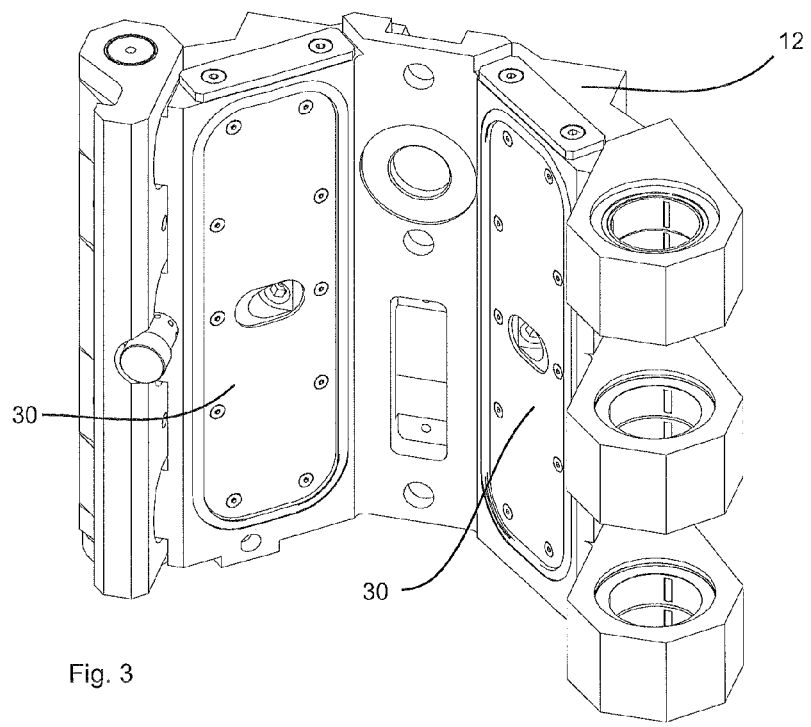
FIG. 3 shows a view of a lateral carrier part.

FIG. 3 shows a view of the lateral part carrier 12. What can be seen here, too, are the expansion elements 30 which are used to urge the lateral part carriers 12 and the lateral part provided thereon apart and to urge in this way the lateral part 2 towards the second lateral part 4. In the view shown in FIG. 3, two such expansion elements are provided, which therefore ensure that the lateral part provided thereon is uniformly urged in a resulting direction, here in a direction that extends as an angle bisector between the two expansion elements.

Figure 4:
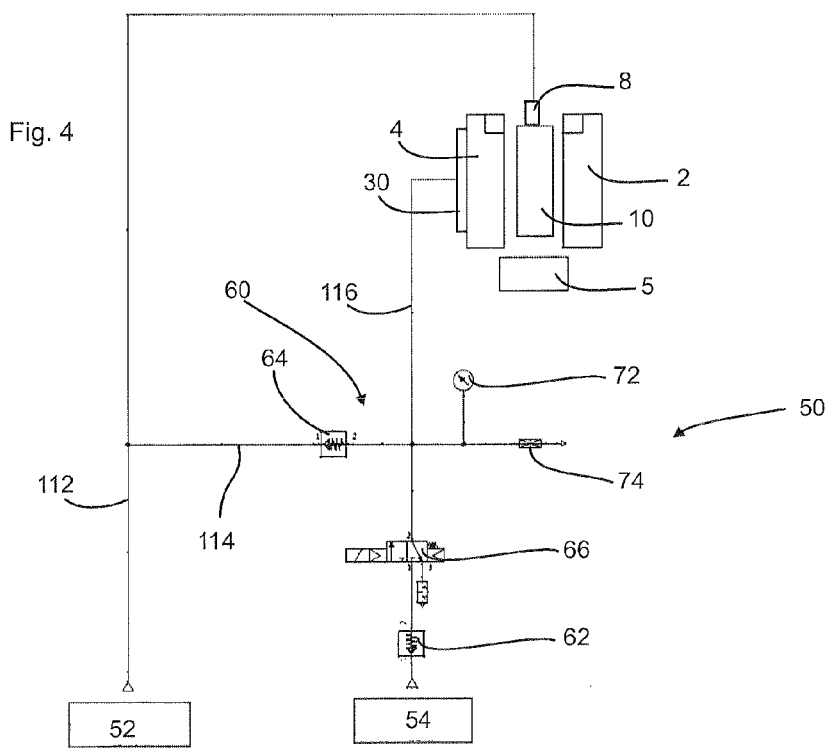
FIG. 4 shows a block diagram view of an apparatus according to the invention.

FIG. 4 shows a further view for illustrating the apparatus according to the invention. What can be seen here again are the two lateral parts 2 and 4 and, in a very schematic view, also the expansion element 30, which can also have pressurised air applied thereto. Reference numeral 10 identifies a plastic preform that can be introduced into the blow mould, and reference numeral 5 identifies a bottom part which terminates the blow form or the cavity thereof towards the bottom.

Reference numeral 52 identifies a reservoir that is used for applying blow air onto the plastic preform 10. To this end, a connection line 112 is provided between the reservoir 52 and the plastic preform or an application unit such as a blow nozzle, which applies air onto the plastic preform.

Reference numeral 54 characterises a further reservoir used for applying blow air onto the expansion element 30, and again a connection line 116 is provided for this purpose.

The control of the air supply to the expansion element is here carried out, inter alia, by means of two valves 62, 64 which are formed as check valves. Prior to the actual expansion process, the check valve 62 is opened so that air flows from the reservoir 54 to the expansion element 30 under a pressure of for example 5 bars.

As soon as the blow pressure rises above a certain level, it will also reach the expansion element through the check valve 64. In this case it is conceivable that the check valve 62 is closed by exactly this pressure. Reference numeral 72 identifies a pressure measuring device that measures the pressure present on the expansion element 30. Reference numeral 74 identifies an outlet unit such as for example a throttle. The pressure that can be supplied to the pressure pad or the expansion element 30 can advantageously be controlled via a further valve 66 and can in particular be switched on or off. In this regard, a pressure pad reduction (PPR) may here also be provided. Reference numeral 60 identifies the control unit that controls the application of pressure onto the expansion element. The above-mentioned valves are components of this control unit 60. Reference numeral 8 identifies an application unit (shown only very schematically) such as for example a blow nozzle that applies the gaseous medium onto the plastic preforms 10.

Figure 5:
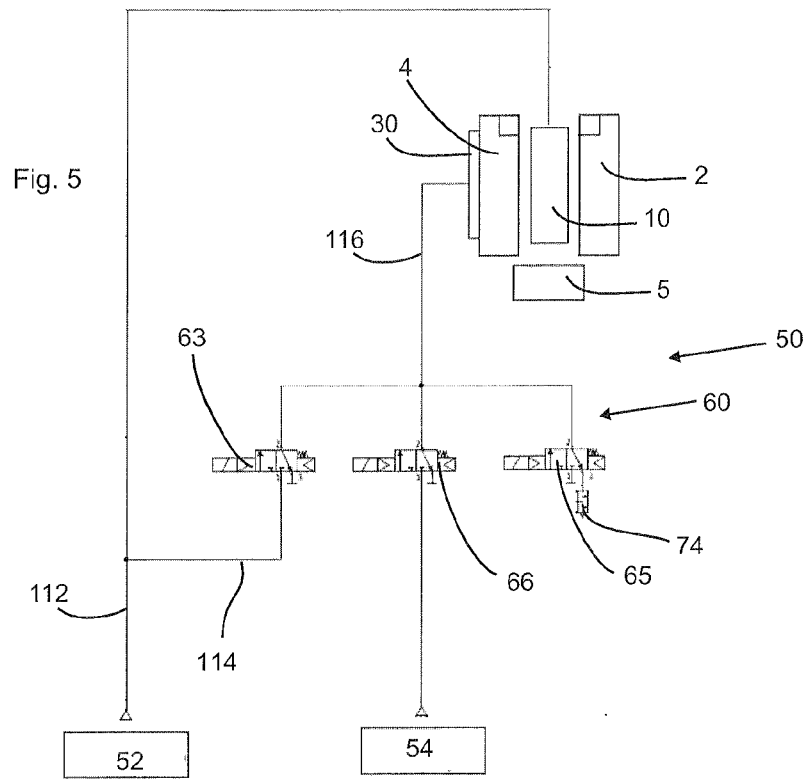
FIG. 5 shows a further block diagram view of an apparatus according to the invention.

FIG. 5 shows a further view of an arrangement according to the invention. The view of the actual moulding station corresponds here to the view shown in FIG. 4. However, in this case three controllable valves 63, 66 and 65 are provided, via which the supply of pressure to the moulding unit 1 can be controlled. Reference numeral 65 relates to a valve that is used for venting. The valve 66 can control the supply of pressurised air from the reservoir 54 and reference numeral 63 identifies a valve that can control the supply from the reservoir 52, which also supplies the blow air. By way of an appropriate wiring of the valves it can be established at what point in time no supply of pressure to the expansion element is carried out, at what points in time or during which periods of time a supply of air from the reservoir 54 (at the lower pressure) is carried out and during which periods of time the supply from the reservoir 52 is carried out.

Figure 6:
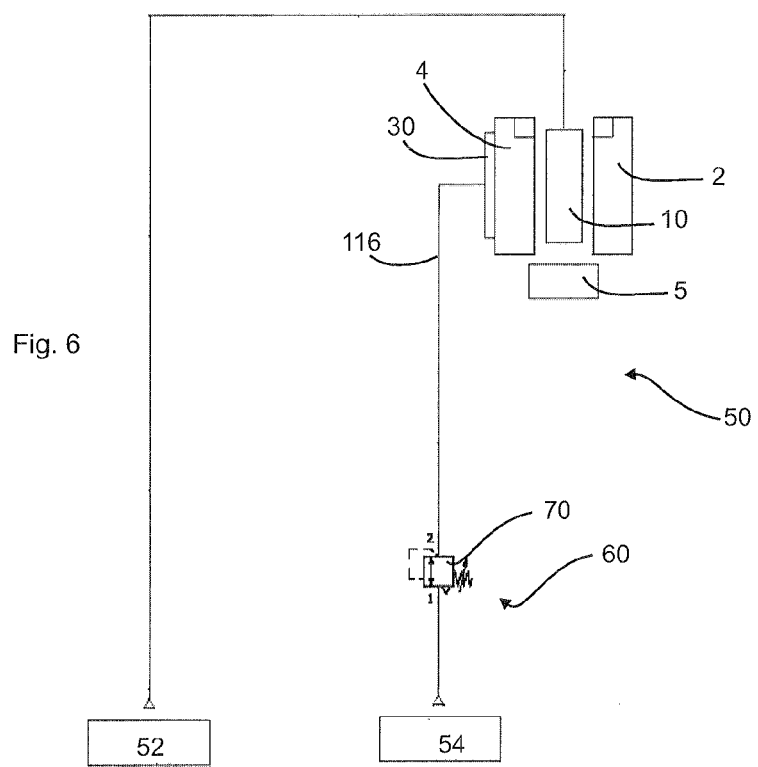
FIG. 6 shows a further block diagram view of an apparatus according to the invention.

FIG. 6 shows a further arrangement according to the invention. Here, the control of air supplied to the expansion element 30 is carried out exclusively via a valve 70 which may be in particular, but not exclusively, a so-called proportional valve.

FIG. 7 shows a pressure profile for the expansion element. Here, a pressure curve P1 is shown which illustrates the pressure that is being applied onto the plastic preform during the expansion process. Here, a pre-blowing pressure is initially applied to the plastic preforms, subsequently an intermediate blowing pressure and finally a final blowing pressure that is maintained over a predetermined period of time, in order to shape the container and to maintain it in this shaped condition. Reference sign Tb identifies the point in time at which the expansion process or the application of pressure onto the plastic preform is started.

Reference signs Pe1 and Pe2 illustrate two sections of the pressure profile which is applied to the expansion means. During a first period of time dT1, a first predetermined pressure Pe1 is applied to the expansion element 30, which is here preferably constant and amounts to up to 7 bar, preferably approximately 5 bar. In the second predetermined section dT2, a pressure Pe2 is applied to the expansion element 30, which is adapted to the pressure P1 and corresponds thereto. At this point, the application of the pressure Pe2 onto the expansion element is stopped again, as soon as the pressure on the plastic preform drops, i.e. the plastic preform is relieved again. However, it would also be possible to maintain the pressure on the expansion means until after the expansion process is completed. In section dT2, the pressure profile in expansion element 30 substantially follows the pressure that is used for pressurising or shaping the plastic preforms into plastic containers. As soon as the pressure in section dT2 exceeds the pressure in section dT1, the pressure profile in the expansion element follows the pressure profile of section dT2. As soon as the pressure in section dT2 is lower than the pressure in section dT1, the pressure profile in the expansion element follows that of the first section dT1.

The applicant reserves the right to claim all of the features disclosed in the application documents as being essential to the invention, insofar as they are novel over the prior art either individually or in combination.

LIST OF REFERENCE SIGNS

1 Moulding unit
2 First lateral part
4 Second lateral part
5 Bottom part
8 Application unit
10 Plastic preform
12 First lateral part carrier
14 Second lateral part carrier
15 Cavity
16, 18 Locking elements
22 First blow mould carrier shell
24 Second blow mould carrier shell
30 Expansion elements
52 Reservoir
54 Further reservoir
62 Check valves
63 Controllable valve
64 Further check valve
65 Controllable valve
66 Further valve/Controllable valve
70 Valve/Proportional valve
72 Pressure measurement unit
74 Discharge unit
112 Connection line
116 Further connection line
Pe1, Pe2 Sections of pressure application
dT1, dT2 Time sections of pressure allocation
Tb Point in time at which the application of pressure onto the plastic preform starts

The invention claimed is:

1. A method for moulding plastic preforms, wherein the plastic preforms are introduced into a blow mould and are expanded by applying a flowable medium thereto, which is introduced into an internal space of the plastic preforms, wherein said blow mould includes at least two lateral parts which form a cavity during the expansion of the plastic preforms, within which the plastic containers are expanded, wherein said lateral parts are respectively provided on lateral part carriers that are moved relative to each other for opening and closing the blow mould, and wherein at least one arrangement of a lateral part carrier and the lateral part provided thereon has an expansion element adapted to have a gaseous medium applied thereto, which expansion element ensures, when the gaseous medium is applied thereto, that one lateral part is moved towards the other lateral part, wherein during the expansion of the plastic preforms, at least two different pressure levels are applied to the latter, and wherein this application of pressure to the plastic preform is started at a predetermined point in time (Tb), wherein during said expansion process, a first pressure (Pe1) is applied to said expansion element during a first time section (dT1) of said expansion process and a second pressure (Pe2) that is greater than said first pressure (Pe1) is applied during a second time section (dT2) that follows in time after the first time section (dT1), wherein the first pressure deviates at least at times, from an instantaneous pressure that is applied onto the plastic preform.

2. The method as claimed in claim 1, wherein the second pressure (Pe2) is at least twice as large as the first pressure (Pe1).

3. The method as claimed in claim 1, wherein pressure is already applied to the expansion element prior to pressure being applied to the plastic preform.

4. The method as claimed in claim 1, wherein the first pressure is between 2 bar and 25 bar.

5. The method as claimed in claim 1, wherein the second pressure is an intermediate and/or final blowing pressure that is applied onto the plastic preform.

6. The method as claimed in claim 1, wherein the first pressure is between 3 bar and 20 bar.

7. The method as claimed in claim 1, wherein the first pressure is between 3 bar and 15 bar.

8. The method as claimed in claim 1, wherein the first pressure is between 4 bar and 10 bar.

9. The method as claimed in claim 1, wherein the first pressure (Pe1) is applied to the expansion element before pressure is applied to the plastic preform.

10. The method as claimed in claim 1, wherein pressure applied to the expansion element is always equal to or greater than pressure applied to the plastic preform.

11. The method as claimed in claim 1, wherein pressure applied to the expansion element is lower, at least at times, than a maximum pressure applied to the plastic preform.

12. The method as claimed in claim 1, wherein the second time section (dT2) and the first time section (dT1) both are after the predetermined point in time (Tb).

13. The method as claimed in claim 1, wherein the predetermined period of time (Tb) is a point in time, at which the blowing process or application of pressure to the plastic preforms is started.

14. The method as claimed in claim 1, wherein the expansion element is a pressure pad.

15. The method as claimed in claim 1, wherein the blow mould includes a space into which the flowable medium can be applied and which as a result of this application will at least slightly expand, so that one lateral part moves towards the other lateral part, so that the one and other lateral parts are clamped shut, whereupon, the two lateral parts are pressed against one another more firmly, in order to avoid or reduce a formation of seams.

16. The method as claimed in claim 1, wherein an expansion element is provided in a region between the lateral part carrier and the lateral part of the blow mould which is associated with the lateral part carrier.

17. The method as claimed in claim 1, wherein the expansion element is located between the lateral part carrier and a blow mould carrier shell provided on the lateral part carrier.

* * * * *